(12) United States Patent  
Iden

(10) Patent No.: US 8,322,041 B1
(45) Date of Patent: Dec. 4, 2012

(54) COMPASS WITH IMPROVED DECLINATION ADJUSTMENT

(75) Inventor: Marlin Iden, Riverton, WY (US)

(73) Assignee: Fenix Outdoor AB, Ornskoldsvik (SE)

( * ) Notice: Subject to any disclaimer, the term of this patent is extended or adjusted under 35 U.S.C. 154(b) by 0 days.

(21) Appl. No.: 13/181,790

(22) Filed: Jul. 13, 2011

(51) Int. Cl.
  *G01C 9/00* (2006.01)
(52) U.S. Cl. .......................... 33/351; 33/354
(58) Field of Classification Search .......... 33/332, 33/371, 391, 351, 352, 354, 365, 369
  See application file for complete search history.

(56) References Cited

U.S. PATENT DOCUMENTS

| | | | | |
|---|---|---|---|---|
| 3,568,322 A | * | 3/1971 | Showers | 33/332 |
| 4,188,729 A | * | 2/1980 | Peterson | 33/332 |
| 4,438,568 A | * | 3/1984 | Kramer et al. | 33/348 |
| 5,937,371 A | * | 8/1999 | Gruetzmacher | 702/154 |
| 6,032,376 A | * | 3/2000 | Shurtleff | 33/391 |
| 6,240,649 B1 | * | 6/2001 | McElroy | 33/286 |
| 6,647,633 B2 | * | 11/2003 | Iden | 33/352 |
| 6,701,631 B1 | * | 3/2004 | Monteiro et al. | 33/1 E |
| 6,874,240 B1 | * | 4/2005 | Cruttenden | 33/451 |
| 2002/0083604 A1 | * | 7/2002 | Iden | 33/351 |
| 2003/0167646 A1 | * | 9/2003 | Lin | 33/391 |

\* cited by examiner

*Primary Examiner* — Yaritza Guadalupe-McCall

(74) *Attorney, Agent, or Firm* — Nixon & Vanderhye PC

(57) ABSTRACT

A recreational or outdoor compass is comprised of a base member and a vial assembly pivotally coupled to said base member. The vial assembly comprises a vial and a magnetized indicator member pivotally journaled in the vial and pointing to magnetic north. The vial assembly is further comprised of an azimuth ring indirectly or directly frictionally coupled to the vial and a transparent disc member permanently aligned with the azimuth ring and arranged below the vial. Moreover, the vial assembly comprises a retention means permanently aligned with the azimuth ring, such that holding of the retention means allows to rotate the vial separately from the azimuth ring by exceeding the frictional force.

13 Claims, 4 Drawing Sheets

COMPASS WITH IMPROVED DECLINATION ADJUSTMENT

FIELD OF THE INVENTION

The present invention relates to an outdoor or recreational compass, more particularly to a hand-held compass for orienteering, direction-finding and locating positions on topographic maps.

BACKGROUND OF THE INVENTION

Compasses of various kinds are known in the state of the art and are used for orienteering, i.e. the practice of using a map and a compass to determine the route of travel. Commonly, those compasses comprise a base member and a vial assembly pivotally coupled to the base member. The vial assembly comprises a vial and an azimuth ring as well as a magnetized indicator member pivotally journaled in the vial. Moreover, an orienting marker is located in the vial. Commonly, the orienting marker is in form of an orienting arrow.

Generally, the magnetized indicator member is a needle pointing to magnetic north. However, the magnetic north is not equal to true north, i.e. the direction along the earth's surface to the geographic North Pole. This magnetic declination varies on the temporal and on the spatial scale. In general, topographic maps are drawn to true north. Hence, those maps intended for navigational purposes contain information on the size of the declination and of the angle of the declination. For instance, on the maps issued by the U.S. Geological Survey, a diagram is provided showing the relationship between true north and magnetic north.

For taking a bearing using a compass and a map, the orienting marker is "moved" by an angle accounting for the declination as given on the map. For instance, if the declination is 5° E, the orienting marker must lie 5° E of 0° N. For doing so, the vial has to be moved relative to the azimuth ring, as the orienting marker is part of the vial. Despite of the needle still pointing towards magnetic north, the azimuth ring and the bearings taken now represent true north bearings.

To account for the declination when using the compasses known in the state of the art, tools are often required to rotate the vial relative to the azimuth ring. Alternatively, the coupling between the vial and the azimuth ring is provided by power of a spring. Hence, one either needs a separate member or a complex construction which is prone to disadvantages e.g. caused by the entering of water or dirt to that can impede the movement of the declination setting mechanism.

The objective of the present invention is to provide a compass which facilitates to account for the declination.

SUMMARY OF THE INVENTION

The present invention is directed to overcoming the problems set forth above by providing a compass with improved bearing precision with the features of claim 1. Preferred embodiments of the invention are disclosed in the dependent claims 2 to 13.

The inventive compass comprises a base member and a vial assembly pivotally coupled to said base member. The vial assembly comprises a vial, a magnetized indicator member pivotally journaled in the vial and pointing to magnetic north, and an azimuth ring frictionally coupled to the vial. The vial assembly further comprises a transparent disc member permanently aligned with the azimuth ring. The transparent disc member is arranged below the vial, i.e. that side of the compass facing the map. In addition, the vial assembly comprises a retention means permanently aligned with the azimuth ring. Holding the retention means allows to rotate the vial separately from the azimuth ring by exceeding the frictional force. It is within the scope of the invention that the vial is in fact directly or indirectly frictionally coupled to the azimuth ring. Hence, any other member rotating together with the azimuth ring may frictionally be coupled to the vial such that the vial is at least indirectly frictionally coupled to the azimuth ring.

Accordingly, there is neither a need for a special tool nor a movable member is necessary to rotate the vial relative to the azimuth ring. This greatly facilitates the handling of the compass for adjusting the declination. Moreover, the construction of the compass is straightforward, increasing the durability on the one hand and decreasing costs on the other hand.

According to another aspect of the invention, the disc member is provided with a centered through opening. Hence, the vial can be grasped from both sides, i.e. the top side and the bottom side of the compass. This eases the movements necessary for rotation of the vial relative to the azimuth ring.

According to another aspect of the invention, the disc member has orienting lines. For instance, these lines can be printed or engraved. The lines are used to orient the compass parallel to the longitudinal or meridian lines provided by the map respectively. This allows one to adjust the declination by rotating the vial without moving the orienting lines. Furthermore, the gap between the map and the orienting lines is greatly reduced. This provides a better, more accurate reading.

According to another aspect of the invention, the orienting lines are colored in black. This enhances the reading.

According to another aspect of the invention, the disc member has a degree scale. The degree scale can be used to adjust for the declination. In addition, the degree scale can be used as an inclinometer degree. Then, a separate pointer is provided in the vial pointing to the degree of incline or decline when the compass is turned on its side with a straight edge aligned with terrain to measure.

According to another aspect of the invention, the degree scale is colored in blue. Hence, the degree scale can be better distinguished from the information provided e.g. on the map.

According to another aspect of the invention, the retention means is arranged below the vial. Thus, the retention means does not interfere when rotating the vial assembly.

According to another aspect of the invention, the retention means is a ring shaped member. One can grasp the ring shaped retention means at any position, which eases the handling of the compass. In particular, the declination setting is greatly facilitated.

According to another aspect of the invention, the ring shaped member is adjusted in a plane with the disc member. Hence, the gap between the disc member and the map can be minimized as the ring shaped member does not protrude in direction of the map.

According to another aspect of the invention, the surface of the retention means is configured to allow for a high grip. As compasses are commonly used outdoors, the usage should be possible irrespectively of the environmental conditions. For instance, during a heavy rain, the adjustment of the declination shall also be possible without any problems. Hence, a high grip of the surface of the retention means allows for adjustment of the declination even if the compass is covered by e.g. a water film.

According to another aspect of the present invention, the vial has an orienting marker. The orienting marker is used to adjust the declination.

According to another aspect of the present invention, the vial is transparent. This ensures that the compass can be used together with a map by placing the compass onto the map, still being able to identify the map's content, e.g. longitudinal lines.

According to another aspect of the present invention, the vial is filled with a fluid. In particular, the vial is filled with a dampening fluid. The fluid dampens the spinning action of the needle. Hence, shivering of the needle is avoided resulting in a quicker and more accurate readability of the bearing.

The foregoing is given more for the purpose of illustration and not limitation with respect to different features of the compass.

The above and other objects, advantages and features of the present invention will become more readily appreciated and understood from consideration of the following detailed description of a preferred embodiment of the present invention when taken together with the accompanying drawings.

DETAILED DESCRIPTION OF THE DRAWINGS

Figure 1:
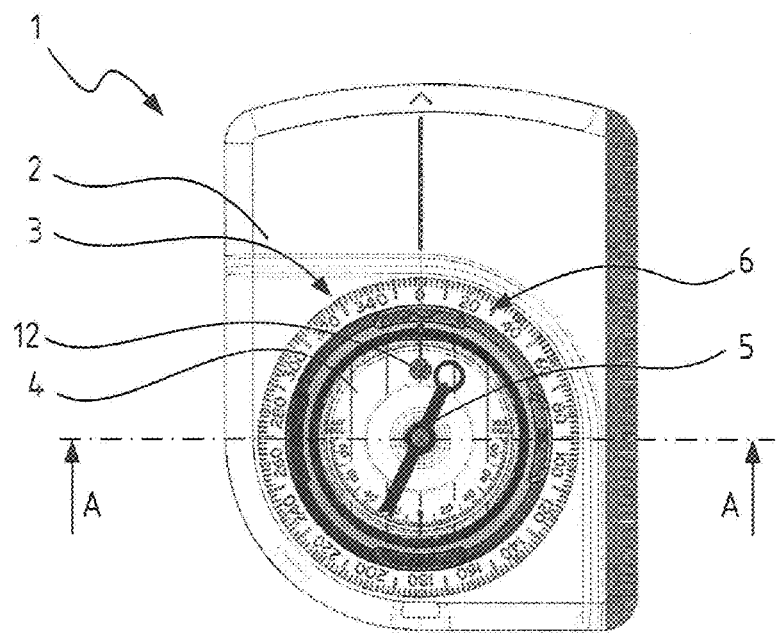
FIG. 1 is a top plan view of the preferred embodiment of the invention.
Figure 2:
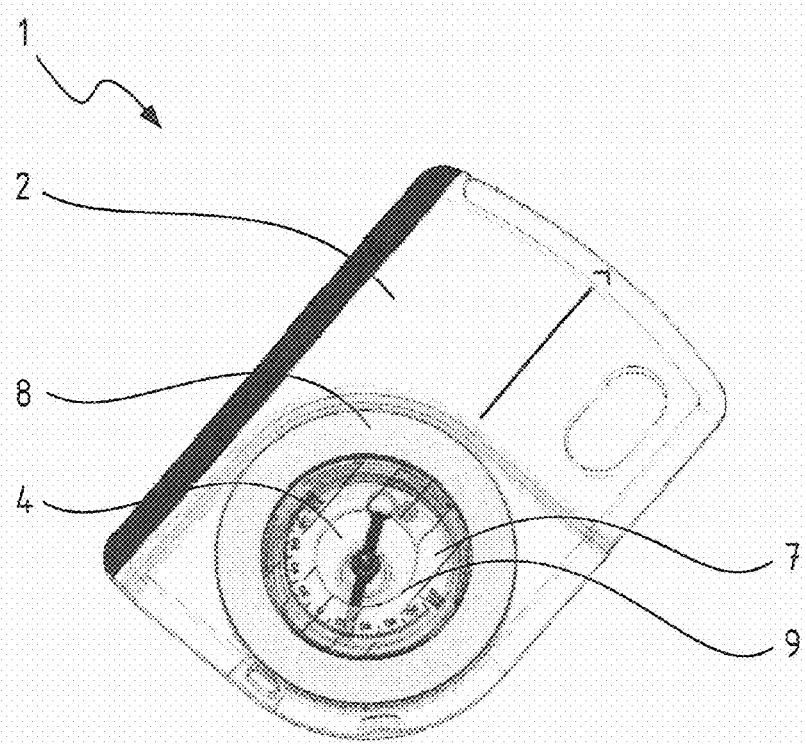
FIG. 2 is a perspective bottom view of the compass of FIG. 1.
Figure 3:
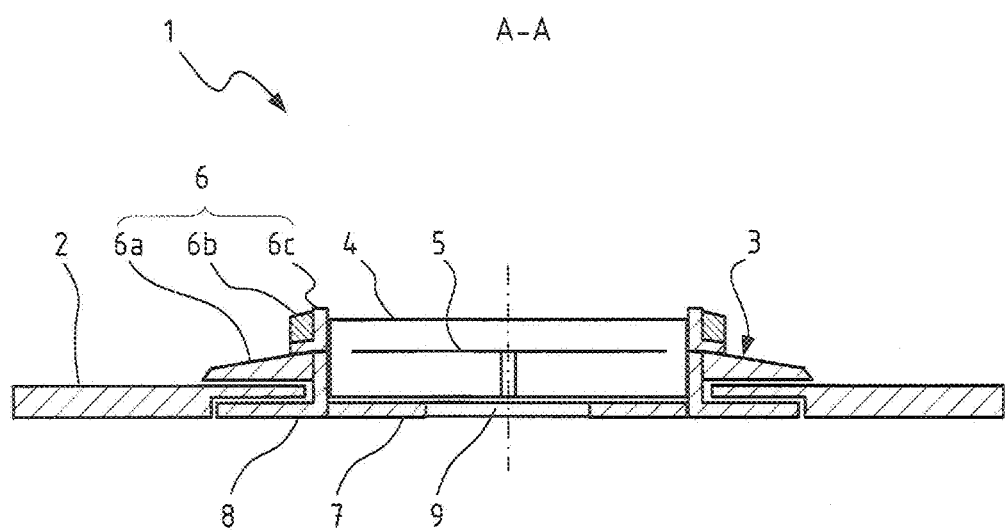
FIG. 3 is cross-sectional view of the compass of FIG. 1.

A compass 1 is illustrated in FIGS. 1 to 3 broadly comprise of a transparent base member 2 being made of a plastic material and a vial assembly 3 pivotally mounted to the base member. The base member 2 has a ruler on one side.

The vial assembly 3 comprises a fluid filled and sealed compass capsule or vial 4 having an orienting marker 12 on its bottom side. The orienting marker can be printed or engraved and can be of any color, e.g. red. A rotatable magnetized indicator member in 5 in form of a needle is pivotally journaled in the vial 4, with the pivot axle of the needle 5 being in the center of the vial 4. The needle 5 comprises a north end, a south end and a through hole positioned at the north end of the needle 5. The through hole has an inner contour of circular shape essentially corresponding to the outer contour of the orienting marker. The movement of the needle 5 is dampened by the clear fluid filled in the vial 4.

The vial assembly 3 further comprises an azimuth ring surrounding the vial 4, the azimuth ring 6 having a degree scale disc 6a with a degree scale in 2°-steps and a rubber casing 6b supported on a support ring with emphasized orientation information, depicted by the letters "N", "S", "E" and "W" aligned with the degree scale. A transparent disc is provided on the bottom of the vial assembly having longitudinal lines and a degree scale printed or engraved on it.

As best seen in FIG. 2, the vial assembly 3 further comprises a disc member 7 being arranged below the vial 4. This disc member 7 has a centered through opening 9, which allows to grasp the vial 4 from both sides, i.e. the bottom side of the compass 1 as shown in FIG. 2 and the top side of the compass as shown in FIG. 1. The through opening 9 is preferably dimensioned such that a human finger can easily be brought into contact with the vial 4.

A retention means 8 is also provided below the vial 4. The retention means 8 is formed as a ring shaped member being aligned in a plane with the disc member 7 and surrounding the disc member 7. The retention means 8 is preferably made of a material allowing for a high grip on its surface.

FIG. 3 is a schematic cross sectional view of the compass 1 shown in FIG. 1. The cross section is drawn along the line indicated by A-A in FIG. 1. The azimuth ring 6 comprises of the degree scale disc 6a, the rubber casing 6b and the supporting ring 6c. The azimuth ring member 6a, 6b, 6c may be coupled e.g. by lugs. The azimuth ring 6, the disc member 7 and the retention means 8 are permanently aligned, e.g. by latches or lugs, or the parts may be glued together. Hence, when rotating the azimuth ring 6, the disc member 7 and the retention means 8 are rotated as well. A part of the base member 2 is enclosed between the azimuth ring 6 and the retention means 8 such that the azimuth ring 6 can be rotated together with the disc member 7 and the retention means 8 relative to the base and simultaneously, the vial assembly 3 is steadily hold in its position on the base member 2.

The vial 4 is frictionally coupled to the azimuth ring 6, such that the vial 4 is rotated together with the azimuth ring 6. Alternatively, the vial 4 can be frictionally coupled to the retention means 8 or any other member of the vial assembly 3, and hence, be indirectly coupled to the azimuth ring 6. The vial 4 may be secured in its vertical position relative to the base member 2 by circumferential supporting means provided with the azimuth ring 6 or the retention means 8. Alternatively, the vial 4 may also be secured by any other supporting means, e.g. a tongue and groove connection.

In use, the ring shaped retention means 8 is held by the user with one hand, and the vial 4 is grasped with the other hand, preferably by placing one finger on the top side of the vial 4 and another finger on the bottom side of the vial 4, by reaching through the through opening 9 of the disc member 7. Hence, the vial 4 can be rotated individually relative to the azimuth ring 6 and the base member 2 respectively, by exceeding the frictional force that frictionally couples the azimuth ring 6 to the vial 4.

Figure 4:
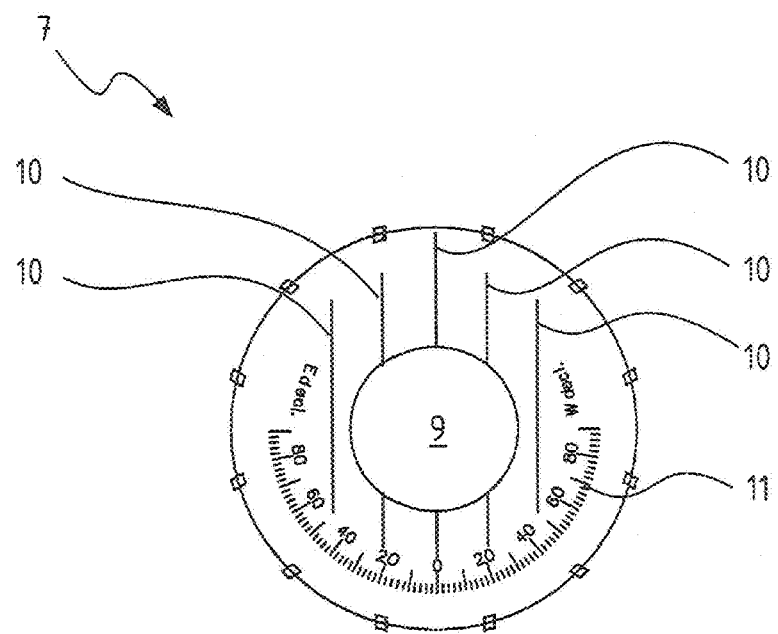
FIG. 4 is a top plan view of the disc member.

FIG. 4 is a detailed top view of the disc member 7. As illustrated, disc member 7 is provided with a plurality of parallel and equally spaced orienting or meridian lines 10. In addition, disc member 7 is provided with a degree scale 11. The degree scale 11 covers 90° in East-declination and 90° in West-declination. The degree scale 11 is subdivided by 2°-steps. In assembled state of the compass 1, the declination can be adjusted by "moving" the vial 4 and, hence, the orienting marker 12 by the required declination angle in using the degree scale 11. The disc member 7 is preferentially made of a transparent plastic material such that one can see through the vial 4 and the disc member 7 when the compass 1 is placed on a map.

While a preferred embodiment of the invention is herein set forth and described, it is to be understood that various modifications and changes may be made therein including but not limited to construction and arrangement of elements as well as their composition without departing from the spirit and scope of this invention as defined by the appended claims and reasonable equivalents thereof.

| Reference signs | |
| --- | --- |
| 1 | compass |
| 2 | base member |
| 3 | vial assembly |
| 4 | vial |
| 5 | magnetized indicator member |
| 6 | azimuth ring |
| 6a | degree scale disc |
| 6b | rubber casing |
| 6c | supporting ring |
| 7 | disc member |
| 8 | retention means |
| 9 | through opening |

-continued

| Reference signs | |
|---|---|
| 10 | orienting lines |
| 11 | degree scale |
| 12 | orienting marker |

The invention claimed is:

1. A compass comprising
a base member; and
a vial assembly pivotally coupled to said base member, the vial assembly comprising:
   a vial;
   a magnetized indicator member journaled in the vial;
   an azimuth ring indirectly or directly frictionally coupled to the vial; and
   a transparent disc member permanently aligned with the azimuth ring and arranged below the vial;
wherein the vial assembly further comprises a retention means permanently aligned with the azimuth ring, such that holding the retention means allows rotation of the vial separately from the azimuth ring and the retention means permanently aligned with the azimuth ring by exceeding a frictional force coupling the azimuth ring to the vial.

2. The compass of claim 1, wherein the disc member is provided with a centered through opening.

3. The compass of claim 1, wherein the disc member includes orienting lines.

4. The compass of claim 3, wherein the orienting lines are colored in black.

5. The compass of claim 1, wherein the disc member includes a degree scale.

6. The compass of claim 5, wherein the degree scale is colored in blue.

7. The compass of claim 1, wherein the retention means is arranged below the vial.

8. The compass of claim 1, wherein the retention means is a ring shaped member.

9. The compass of claim 8, wherein the ring shaped member is adjusted in a plane with the disc member.

10. The compass of claim 1, wherein the surface of the retention means is configured to allow for a high grip.

11. The compass of claim 1, wherein the vial has an orienting marker.

12. The compass of claim 1, wherein the vial is transparent.

13. The compass of claim 1, wherein the vial is filled with a fluid.

* * * * *